Patented Mar. 5, 1935

1,993,025

UNITED STATES PATENT OFFICE 1,993,025

ALPHA - TERPINENE - MALEIC ANHYDRIDE REACTION PRODUCT AND METHOD OF PRODUCING IT

Ernest G. Peterson, Kenvil, and Edwin R. Littmann, Haddonfield, N. J., assignors to Hercules Powder Company, Wilmington, Del., a corporation of Delaware No Drawing. Application November 18, 1930, Serial No. 496,560

16 Claims. (Cl. 260—123)

Our invention relates to a resinous compound and to a method for its production.

Heretofore, as is shown, for example, in the British Patent No. 300,130, of 1928, to Diels and Alder, it has been known to react maleic anhydride, or equivalently maleic acid, with certain hydroaromatic hydrocarbons, as for example, phellandrene, the reaction products being crystalline compounds.

Now, in accordance with our invention, we have discovered that a resinous composition is produced by reacting maleic anhydride, or equivalently maleic acid, with, specifically, alpha-terpinene, which composition differs essentially from the compositions of Diels and Alder in that it is amorphous and will retain its amorphous state under conditions which in general induce crystallization, hence lending itself for various uses and among others for uses for which compositions having crystalline structure are not adapted.

The resinous composition in accordance with our invention, as we have indicated, is the result of the reaction of maleic anhydride, or maleic acid, with alpha-terpinene.

The resinous composition is a light yellow fairly soft amorphous solid at room temperatures and will be found to possess high stability. The new composition is adaptable for various uses and, for example, will be found to be an efficient thermo-plastic material.

As has been indicated, the resinous composition may be prepared in accordance with the method embodying our invention by reacting alpha-terpinene and maleic anhydride or maleic acid.

Alpha-terpinene may be readily derived from terpenes as, for example, pinene, dipentene, alpha-terpineol, terpin hydrate, etc., by treatment with sulphuric acid, which effects rearrangement of the terpene treated to alpha-terpinene. Thus, for example, 70 cc. of sulphuric acid are added gradually to 2 liters of pinene, 5 cc. of the acid being added at a time with agitation or stirring. The mixture is allowed to cool, then neutralized with an alkali, as sodium hydroxide, and steam distilled. The distillate is then fractionated and the fraction boiling within about the range 172° C.–180° C. collected as the terpinene fraction. If desired alpha-terpinene may be obtained by the fractionation of pine oil using the fraction boiling within about the range 178° C.–182° C.

In proceeding, in accordance with our invention, for the production of the resinous composition, a slight excess of alpha-terpinene, say 480 g., is heated with say 294 g. of maleic anhydride, or alternatively with an equivalent quantity of maleic acid, at a temperature to cause gentle boiling, say about 150° C. to 200° C., for a period of about five hours.

On completion of the heating period the slight excess of alpha-terpinene and impurities insofar as such may be present are removed by applying a vacuum, of say about 15 millimeters of mercury while maintaining a temperature under which the terpinene and impurities will distill off without distillation of the reaction product. The product is then cooled. On cooling to room temperature the composition will solidify into a fairly soft amorphous solid in amount representing a yield of about 80% of theoretical.

It will be noted that on the completion of the reaction the reaction product is recovered directly by the removal of excess alpha-terpinene and such impurities as may be present, it being unnecessary to subject the product to any further purification treatment.

It will be appreciated that the procedure, temperature, time, etc. described herein in connection with the carrying out of our method is for the purpose of illustration only and that we contemplate variation thereof as within the scope of our invention; and it will be further appreciated that maleic acid or anhydride may be used directly or may be formed as a preliminary step, as for example, by the use of fumaric acid, which, as is well known, will be converted into maleic anhydride by heat.

What we claim and desire to protect by Letters Patent is:

1. The product of the reaction of maleic anhydride and alpha-terpinene.

2. The method of producing a resinous composition which includes reacting maleic anhydride and alpha-terpinene.

3. The method of producing a resinous composition which includes reacting maleic anhydride and an excess of alpha-terpinene in the presence of heat at a temperature which will facilitate the reaction.

4. The method of producing a resinous composition which includes reacting maleic anhydride and an excess of alpha-terpinene in the presence of heat at a temperature which will facilitate the reaction, removing excess alpha-terpinene and cooling the reaction product.

5. The method of producing a resinous composition which includes admixing maleic anhydride and an excess of alpha-terpinene and heating the mixture at a temperature of about 150° C.

to about 200° C. for a period of about five hours, vaporizing off excess alpha-terpinene and cooling the reaction product.

6. The method of producing a resinous composition which includes reacting maleic anhydride and alpha-terpinene in the presence of heat at a temperature which will facilitate the reaction.

7. The method of producing a resinous composition which includes reacting maleic anhydride and alpha-terpinene at a temperature of about 150° C. to about 200° C.

8. The method of producing a resinous composition which includes reacting maleic anhydride and an excess of alpha-terpinene at a temperature of about 150° C. to about 200° C.

9. The method of producing a resinous composition which includes reacting maleic anhydride and a terpene cut boiling within about the range 178–182° C.

10. The method of producing a resinous composition which includes reacting maleic anhydride and a terpene fraction boiling within about the range 172–180° C. in which terpenes have been rearranged to form alpha-terpinene.

11. The method of producing a resinous composition which includes reacting maleic anhydride and an excess of a terpene cut boiling within about the range 178–182° C.

12. The method of producing a resinous composition which includes heating alpha-terpinene with fumaric acid to effect conversion of fumaric acid to maleic anhydride and continuing the heating to effect reaction between alpha-terpinene and maleic anhydride.

13. The method of producing a resinous composition which includes heating an excess of alpha-terpinene with fumaric acid to effect conversion of fumaric acid to maleic anhydride and continuing the heating to effect reaction between alpha-terpinene and maleic anhydride.

14. The method of producing a resinous composition which includes heating an excess of alpha-terpinene with fumaric acid to effect conversion of fumaric acid to maleic anhydride and continuing the heating at a temperature of about 150° C. to about 200° C. to effect reaction between alpha-terpinene and maleic anhydride.

15. The method of producing a resinous composition which includes heating alpha-terpinene with maleic acid to effect conversion of maleic acid to maleic anhydride and continuing the heating to effect reaction between alpha-terpinene and maleic anhydride.

16. The method of producing a resinous composition which includes heating alpha-terpinene and maleic acid.

ERNEST G. PETERSON.
EDWIN R. LITTMANN.